T. McDONALD.
DIFFERENTIAL SPEED ROLLER COTTON SEED HULLER.
APPLICATION FILED MAR. 18, 1909.
951,653.
Patented Mar. 8, 1910.
2 SHEETS—SHEET 1.
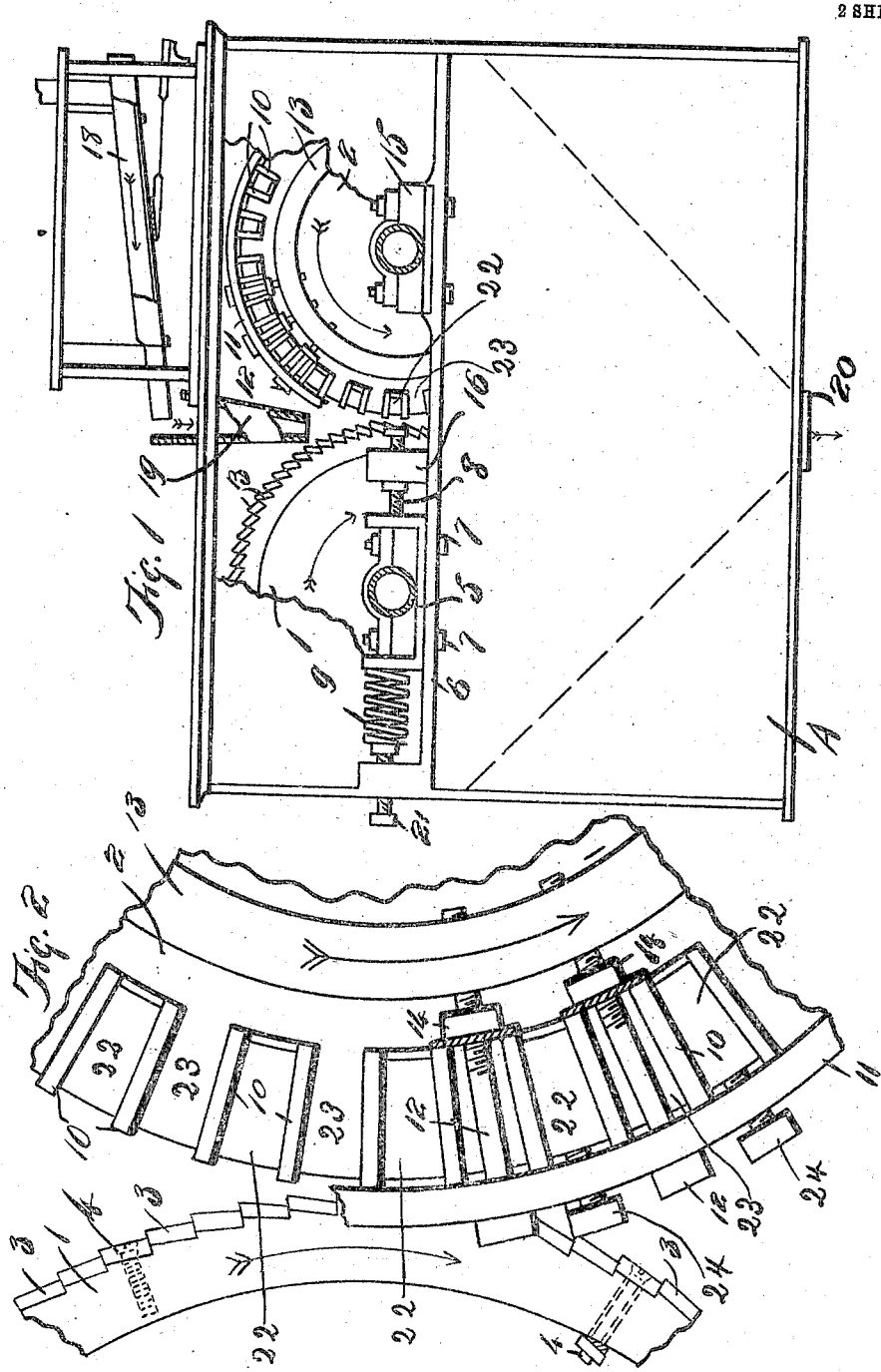

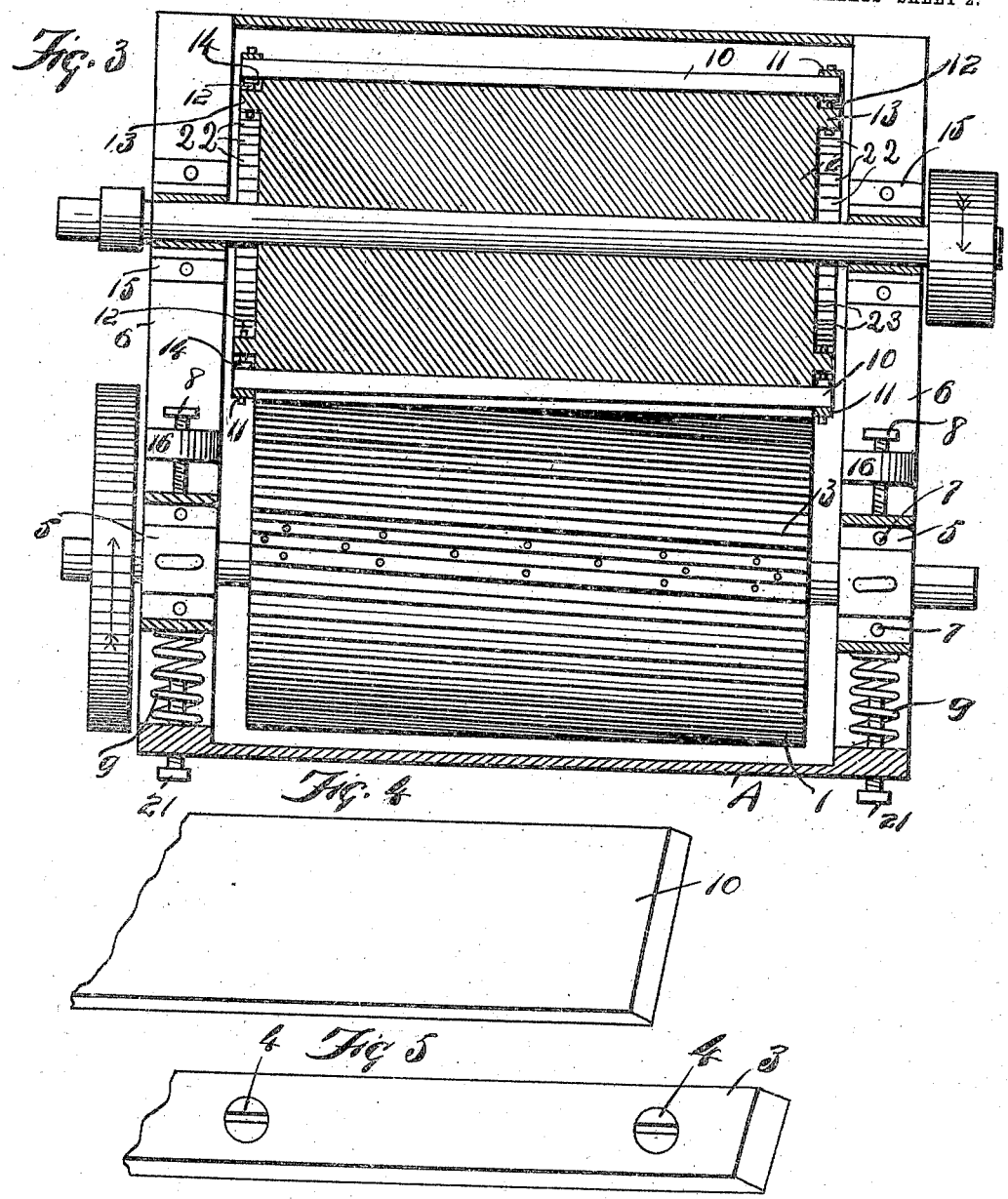

UNITED STATES PATENT OFFICE.

THOMAS McDONALD, OF DUBLIN, TEXAS.

DIFFERENTIAL-SPEED-ROLLER COTTON-SEED HULLER.

951,653.  Specification of Letters Patent.  Patented Mar. 8, 1910.

Application filed March 18, 1909. Serial No. 484,097.

*To all whom it may concern:*

Be it known that I, THOMAS McDONALD, a citizen of the United States, residing at Dublin, county of Erath, and State of Texas, have invented certain new and useful Improvements in Differential-Speed-Roller Cotton-Seed Hullers, of which the following is a specification.

My invention relates to cotton seed hullers and particularly to machines provided with drums carrying blades to be driven at different speeds, and the object is to provide machines for breaking the hull of cotton seed and which machines are provided with reversible and removable blades and which are provided with means for preventing the choking of the machines.

Other objects and advantages will be fully explained in the following description and the invention will be more particularly pointed out in the claims.

Reference is had to the accompanying drawings which form a part of this application and specification.

Figure 1 is a side elevation of the machine with a part of the casing broken away to expose the interior mechanism. Fig. 2 is a broken view of the two blade carrying rollers on an enlarged scale. Fig. 3 is a plan view of the hulling rollers, one of the rollers being shown in section. Fig. 4 is an enlarged broken perspective view of a blade. Fig. 5 is an enlarged broken view of a different blade from that shown in Fig. 4.

Similar characters of reference are used to indicate the same parts throughout the several views.

This machine is provided with an upright frame A and the hulling rollers 1 and 2 are horizontally disposed in said frame. The roller 1 is journaled in sliding bearings 5 which are mounted on the beams 6. Blades 3 are attached to the periphery of the roller or drum 1 by screw bolts 4 in stepped relation. The roller 2 is journaled in stationary bearings 15. Roller 1 is yieldingly mounted relative to roller 2. The object of this arrangement of the rollers relative to each other is to prevent the choking of the machine. Spiral springs 9 press against the bearings 5 and hold these bearings against stud bolts 8. The stud bolts 8 operate in bearings 16 and may be adjusted to hold the roller 1 closer to or farther from the roller 2. The bearings 5 are provided with stub bolts or lugs 7 which move in the beams 6. The blades 3 are detachable from the drum 1 and after one edge of the blade is worn it can be turned 180 degrees and again attached to the drum. When the second edge is worn, the blade can be detached and reversed endwise and attached to the drum and used until the other two edges are worn. Thus each blade 3 has four edges for use in crushing the hulls of cotton seed. The roller 1 is intended to run from 180 to 200 revolutions a minute. The roller 2 is intended to run from 1200 to 1400 revolutions a minute. The roller is constructed with removable and reversible blades. The blades 10 are mounted in grooves in the periphery of the drum and project beyond the ends of the drum. The drum or roller 2 has an annular flange 13 at each end. The blades 10 are held in the grooves in the rollers 2 by bolts 12 which screw into the flange 13 and by rings 11. The bolts 12 enter through the rings 11 and pass between two blades 10 and then screw into the flange 13. Jam nuts 14 and plates 17 serve to adjust the blades 10 to the rings 11. This construction is necessary when the blades 10 are worn. By turning the blades and reversing them endwise the blades can be used until the four corners are worn. The blades can then be ground until the four corners are again sharp. The blades will not be as wide as they were originally, but the plates 17 and the jam nuts 14 can adjust the blades to the rings 11.

The seed are placed in a hopper 18 and are discharged from the hopper 18 into a chute 19 and thus fall between the blades of the drums 1 and 2. The object of this machine is simply to crack the hulls of the cotton seed preparatory to delivering the same to a separator. The hulls of the seed are cracked by making the roller 2 run several times as fast as the roller 1. The blades 10 strike the seed against the edge of the blades 3 and thus crack the hulls. The seed with the cracked hulls are discharged through a hopper 20. Should any hard substance or a bulk of material pass between the rollers, the springs 9 will allow the roller 1 to yield to prevent choking of the machine. Guides 21 are provided to hold the springs 9 against displacement.

Provision is made for wedging the blades 10 in the periphery of the roller 2. Wedges 22 are provided for holding the blades 10 rigidly in the roller. The wedges 22 must be of the same thickness as the integral portions 23 of the roller 2 so that the blades will be equally distant or spaced from each other. The wedges 22 are forced inwardly or radially inward by bolts 24 and these bolts pass through the rings 11. The wedges 22 project beyond the portions 23 of the roller and are as long as the blades 10 so that the wedges will extend under the rings 11. The wedges will effectually prevent any movement of the blades and the wedges will be held practically as rigid as the integral portions 23 of the roller. A wedge 22 and an integral portion 23 of the roller alternate with each other about the entire periphery of the roller.

It is apparent that various changes may be made in the proportion and arrangements of the various elements of the machine herein shown without departing from my invention.

Having fully described my invention, what I claim as new and desire to secure by Letters Patent, is,—

1. A hulling machine having a frame, a slow speed roller and a high speed roller journaled in said frame, yielding bearings for one of said rollers, said slow speed roller having blades attached thereto in stepped relation, said high speed roller having grooves in the periphery thereof and blades rectangular in cross-section carried in said grooves for breaking the hulls of seed against the blades of said slow speed rollers, an annular flange on each end of said high speed roller, rings concentric with said flanges, and bolts projected through said rings radially inward between the ends of said blades and into said flanges.

2. A hulling machine having a frame, a slow speed roller and a high speed roller journaled in said frame, said slow speed roller having detachable blades arranged in stepped relation thereon, said high speed roller having an annular flange on each end thereof and blades carried in the periphery thereof and projecting from the ends thereof co-extensive with said flanges, rings holding said blades in the periphery of said high speed roller, bolts engaging said rings and said flanges, plates, and jam nuts on said bolts clamping said plates against the inner edges of said blades 3. A hulling machine having a frame, a slow speed roller journaled in said frame, yielding bearings for said roller, a high speed roller and fixed bearings therefor, said high speed roller having grooves in the periphery thereof and having annular flanges projecting from each end thereof, blades mounted in said grooves and projecting therefrom and projecting from the ends of the roller, means including bolts projecting between said blades for binding said blades to said flanges, and blades mounted on said slow speed roller in stepped relation.

4. A hulling machine having a high speed roller and a slow speed roller, blades attached to said slow speed roller, said high speed roller having grooves in the periphery thereof and having an annular flange projecting from each end thereof, blades carried in said grooves and projecting from the periphery and the ends thereof, rings concentric with said flanges, bolts projected through said rings and then into said flanges to bind said blades in said grooves, a wedge between each two blades, and bolts projected through said rings to force said wedges radially inward.

5. A hulling machine having a frame, a slow speed roller provided with blades and journaled in said frame, a high speed roller journaled in said frame, said high speed roller having grooves in the periphery thereof and flanges projecting from the ends thereof, blades mounted in said grooves and projecting radially therefrom and projecting from the ends thereof, rings engaging the end portions of said blades, and bolts engaging said rings and attaching the same to said flanges.

6. A hulling machine having a frame, a slow speed roller provided with blades and journaled in said frame, a high speed roller journaled in said frame, said high speed roller having grooves in the periphery thereof and annular flanges projecting from the ends thereof, blades mounted in said grooves and projecting radially therefrom and projecting from the ends thereof, rings engaging said blades, bolts engaging said rings and binding the same to said flanges, and jam nuts engaging said bolts for adjusting said blades to said rings.

7. A hulling machine having a high speed roller and a slow speed roller, blades attached to said slow speed roller, blades carried in the periphery of said high speed roller, means for holding said blades in operative relation including wedges for spacing and holding said blades in spaced relation to each other, rings, and bolts projected through said rings and pressing said wedges radially inward between said blades.

In testimony whereof, I set my hand in the presence of two witnesses, this 15th day of March, 1909.

THOMAS McDONALD.

Witnesses:
A. L. JACKSON,
J. W. STITT.